United States Patent [19]

Anderson et al.

[11] Patent Number: 5,406,448
[45] Date of Patent: Apr. 11, 1995

[54] CAPACITOR HANGER AND ATTACHMENT METHOD

[75] Inventors: David W. Anderson; David W. Morrison, both of Greenwood; James E. Hart, Ninety Six; Richard A. Ashley, Greenwood; James R. Bannister, Jr., Greenwood; Claudus E. McNure, Greenwood; Jerry L. Crawford, Ware Shoals, all of S.C.

[73] Assignee: Cooper Power Systems, Inc., Del.

[21] Appl. No.: 8,231

[22] Filed: Jan. 21, 1993

Related U.S. Application Data

[63] Continuation of Ser. No. 900,032, Jun. 17, 1992.

[51] Int. Cl.⁶ ............................................. H02G 7/20
[52] U.S. Cl. ................................. 361/600; 361/825; 248/300; 248/675; 248/201
[58] Field of Search .............. 361/331, 825, 829, 830; 174/45 R; 219/615–617, 85.2, 85.21, 85.22; 248/300, 675, 201; 336/67

[56] References Cited

U.S. PATENT DOCUMENTS

| | | | |
|---|---|---|---|
| 2,280,689 | 5/1940 | Denneen et al. | 219/617 |
| 2,479,980 | 5/1945 | Stanton | 219/645 |
| 2,625,637 | 3/1948 | Garner et al. | 219/617 |
| 2,871,416 | 1/1959 | Steinbarge | 361/829 |
| 2,948,770 | 8/1960 | Ruscito | 219/91.2 |
| 2,990,497 | 6/1961 | Rugg | 361/331 |
| 3,254,270 | 5/1966 | Aungst | 361/829 |
| 3,639,721 | 2/1972 | Hubbel | 219/91 |
| 3,653,622 | 4/1972 | Farmer | 174/45 R X |
| 3,883,712 | 10/1973 | McBriarty | 219/673 |
| 5,076,198 | 12/1991 | Bottom | 116/276 |

FOREIGN PATENT DOCUMENTS

| | | | |
|---|---|---|---|
| 6009928 | 3/1971 | Japan | 219/615 |
| 3189073 | 8/1991 | Japan | 219/85.1 |

Primary Examiner—Bruce A. Reynolds
Assistant Examiner—Michael D. Switzer
Attorney, Agent, or Firm—William B. Patterson; Eddie E. Scott

[57] ABSTRACT

A hanger for a power factor capacitor and method of attachment by brazing reduces metallurgical changes that can lead to cracks in the tank wall from welding. The hanger has a base plate with a circular opening and a raised shoulder that provides a single ring of contact between the tank wall and hanger. A ring of brazing alloy is placed within the opening on the tank wall. Through induction of electric current, the brazing alloy melts and flows resulting in a complete braze between the hanger and the tank wall which is accomplished at a much lower temperature than other welding techniques.

32 Claims, 3 Drawing Sheets

FIG. 5A
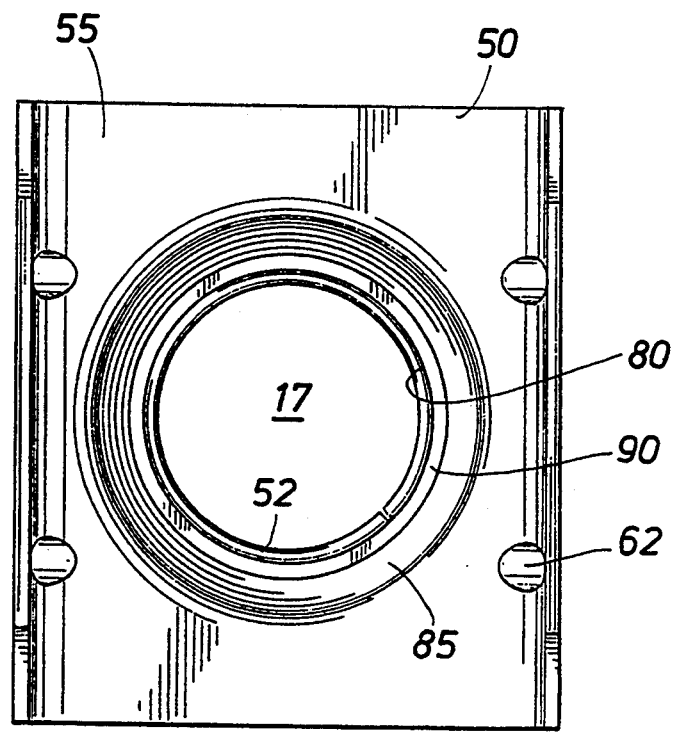
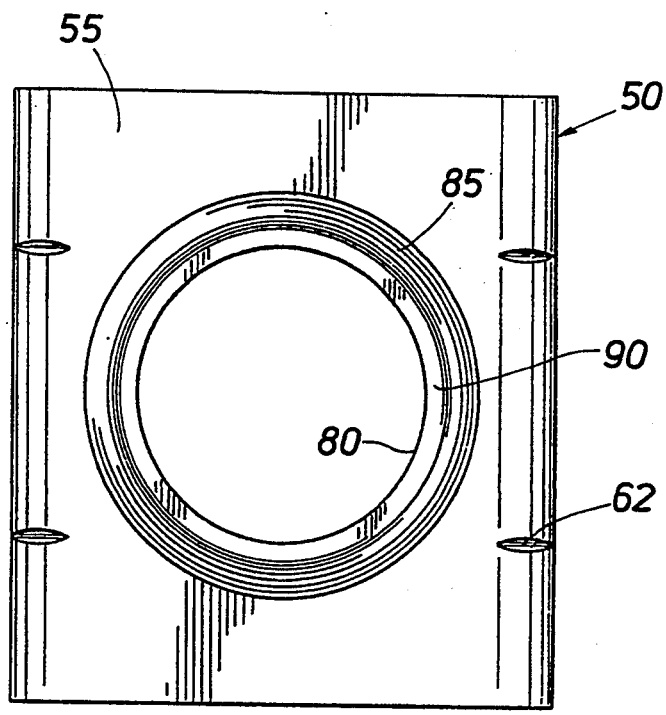
FIG. 4

CAPACITOR HANGER AND ATTACHMENT METHOD

This is a continuation of copending application Ser. No. 07/900,032 filed on Jun. 17, 1992.

The present invention relates to capacitor tanks and hangers; more particularly, the present invention relates to an improved hanger and means of attachment of the hanger to a capacitor tank using a brazing process to avoid cracking of the tank wall due to stresses caused by welding.

BACKGROUND OF INVENTION

The efficiency of power generation, transmission and distribution equipment is improved when it is operated at or near unity power factor. The least expensive way to achieve unity power factor is with the application of power factor correction capacitors. These capacitors provide a static source of leading reactive current and can be installed close to the load. Capacitors can be pole-mounted in racks or used in electrical substations in factory-assembled blocks.

Capacitors consist of a tank structure which confines a dielectric around an electrical component through which electrical current flows. The capacitor tank is rectangular in shape and has two sets of elongated walls, a bottom wall and a top wall. The walls may be formed from stainless steel and are usually protected with an enamel-like finish to resist corrosion and to facilitate dissipation of whatever heat is generated within the capacitor. For convenience in handling and installation, two of the opposite side walls are provided with hangers. Hangers allow the capacitors to be bolted to mounting structures (FIG. 1).

In the past, capacitor hangers have been connected to the capacitor tank wall by a welding process such as tungsten inert gas (TIG) welding wherein an arc plasma from a tungsten electrode radiates heat to melt the work surface in a protective atmosphere of inert gas. TIG welding requires temperatures of about 2300° F. to melt the tank and hanger metals and cause them to fuse together. Because of the heat involved in the TIG welding process and the relatively thin wall thickness (0.040–0.050") of the capacitor tank, the structural integrity of the capacitor tank wall can be compromised by the welding. The resulting change in the metallurgical structure of the tank metal can cause cracks. Since dielectric fluid is sealed in the capacitor tank, a crack can render the entire component useless. To compound the problem, the cracks often do not appear until the capacitors are transported and installed in the field.

There is a need therefore, for a capacitor tank and hanger assembly wherein the hanger can be connected to the capacitor tank without causing cracks in the capacitor tank wall.

SUMMARY OF INVENTION

The present invention provides a capacitor hanger that can be attached to a capacitor tank through a brazing operation that avoids cracks in the capacitor tank wall from metallurgical changes brought about by excessive heat around the hanger weld. A hanger is provided with a base plate for attachment to the capacitor tank wall. The base plate includes a substantially circular aperture having a raised shoulder around its perimeter which extends downward to provide a ring of contact between the capacitor tank wall and the hanger.

Attachment of the hanger to the capacitor tank wall is performed by placing a ring of brazing alloy on the capacitor tank wall just inside the aperture of the hanger. The capacitor tank wall, hanger and ring are then heated until the ring of brazing material liquifies. In its liquid state, the brazing material flows under the raised shoulder of the aperture to the area outside of the aperture. At substantially the same time the brazing material melts, a slightly raised bubble appears on the capacitor tank wall inside the hanger aperture. Cracks in the capacitor tank wall are avoided because of the relatively low temperatures used in the braising process. Deformation of the capacitor tank wall is limited to the bubble-shaped expansion within the aperture of the hanger.

BRIEF DESCRIPTION OF THE FIGURES

FIG. 4 is a bottom view of the hanger;

FIG. 5A is a top view of the hanger, brazing alloy ring and capacitor tank wall;

DESCRIPTION OF AN EMBODIMENT

Figure 1:
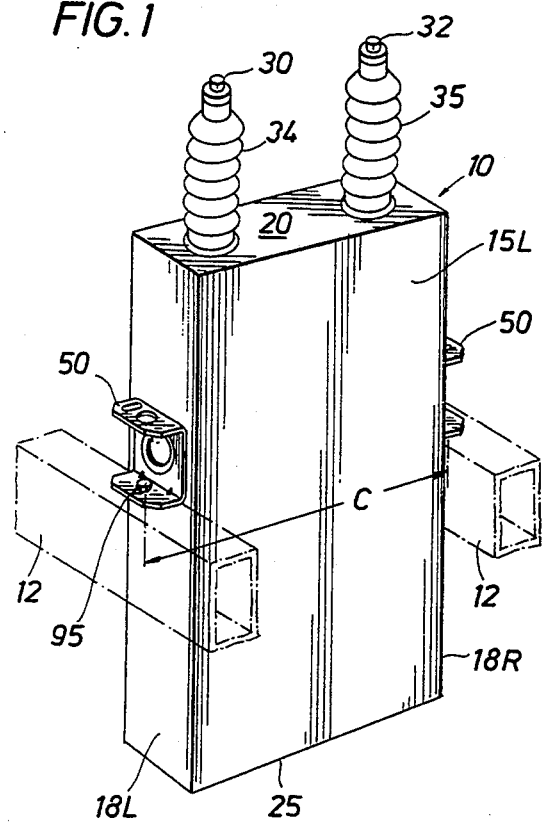
FIG. 1 depicts a power correction capacitor mounted on supports including the hanger that is the subject of the present invention.

FIG. 1 depicts a power correction capacitor 10. The capacitor comprises two sets of walls 15R&L, 18R&L, a top 20 and a bottom 25. The capacitor tank typically contains a plurality of capacitor packs (not shown) consisting of wound layers of metal foil separated by a dielectric layer. The capacitor packs are impregnated with a dielectric fluid which fills the internal volume of the capacitor tank. The exterior of a typical capacitor includes two terminals 30, 32 which are insulated from the capacitor tank surface by a pair of bushings 34, 35. The bushings are typically formed from porcelain which has been glazed to withstand the surrounding environment. In FIG. 1, hangers 50 are depicted on either side 18L, 18R of the capacitor tank. The hangers assist in the handling, transporting and mounting of the transformers. In FIG. 1, mounting supports 12 are shown under each hanger 50 as a means for mounting the capacitor. The hangers 50 are bolted to the mounting supports 12 through an eye 95 in the hanger 50. The mounting center C between the hangers is standardized by the National Electrical Manufacturer's Association (NEMA).

Figure 2:
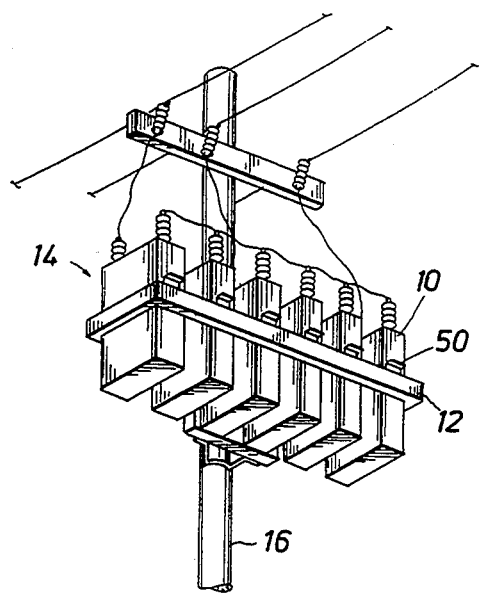
FIG. 2 depicts a pole-mounted rack of capacitors.

Capacitors can be pole-mounted or pad-mounted. FIG. 2 depicts a rack 14 of pole-mounted transformers. Several capacitors 10 are mounted on pole 16 and electrically connected in series or in parallel. Each capacitor 10 is mounted in rack 14 by bolting hanger 50 to support 12 through eye 95 (not shown).

Figure 3:
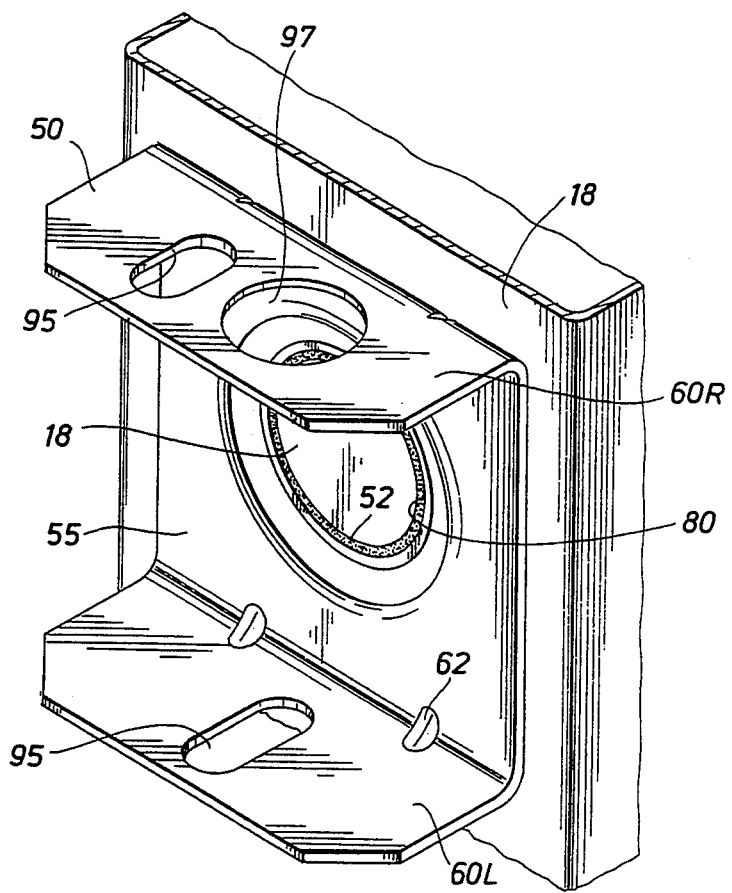
FIG. 3 depicts a capacitor tank wall with a hanger attached according to the present invention.

FIG. 3 depicts the hanger 50 and tank wall after the brazing operation that is the subject of the present invention. The hanger 50 is typically formed of stainless steel and comprises a base portion 55, and two upright legs 60L,R. In the preferred embodiment, stiffeners 62 are formed into the legs 60L,R of hanger 50 for rigidity. Legs 60L,R include elongated eyes 95 that are used for mounting the hanger in an installation rack or block. A lifting eye 97 is included in leg 60R to aid in moving the capacitor before installation. While legs 60L,R extend perpendicular to base 55 in the preferred embodiment, it will be understood that one or both of legs 60L,R could extend from base portion 55 at an angle other than 90°.

Figure 5B:
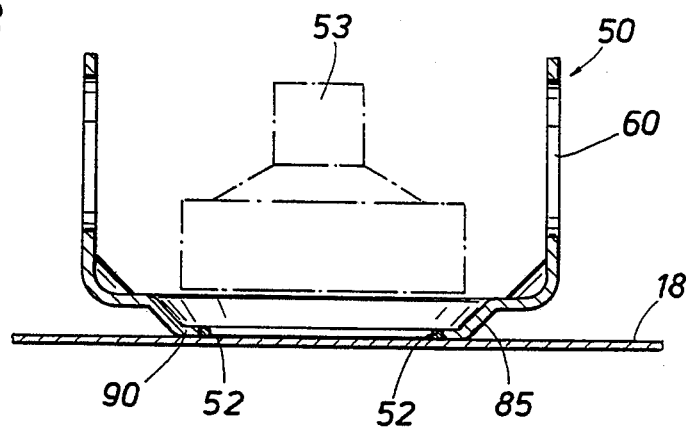
FIG. 5B is a side view, in section of the hanger, alloy brazing ring and capacitor tank before the brazing operation.

The base portion 55 of hanger 50 includes a circular aperture 80. Aperture 80 is formed into the surface of the base portion of hanger 50 in a stamping operation. Aperture 80 facilitates a brazing operation wherein brazing material 52 is used to connect the hanger 50 the capacitor tank wall 18. As depicted in FIG. 4, a bottom view of hanger 50, aperture 80 includes a raised shoulder 85 extending around its perimeter. Raised shoulder 85 extends from the base portion 55 opposite legs 60 and can also be appreciated in FIG. 5B. In the preferred embodiment, shoulder 85 extends from the surface of the base portion 55 at an angle of approximately 45° and terminates in a flat surface 90 which is substantially parallel to the surface of the base plate 55. When the hanger 50 is placed upon the capacitor tank wall, flat surface 90 provides a ring of contact between the hanger 50 and the capacitor tank wall 18 (FIG. 5B).

Aperture 80, with its raised shoulder 85, and flat surface 90 provides two functions. First, it reduces the surface area of hanger 50 exposed to the braze and thus reduces heat transmitted to hanger 50 during the brazing process. Second, it provides a circular area for the capacitor tank wall 17 to expand outward as it is heated during the brazing process.

The brazing operation connects the hanger 50 to the capacitor tank wall 17 through the use of a ring of brazing alloy which is heated to the melting and flowing point. FIG. 5A and 5B depict the capacitor tank wall 17, hanger 50 and brazing alloy ring 52 before the brazing operation. Hanger 50 is placed upon the capacitor wall 17 with raised shoulder 85 extending downward whereby a ring of contact is made between flat surface 90 and tank wall 17. Brazing alloy ring 52 is then placed on the surface of wall 17 within aperture 80. The outside diameter of the brazing alloy ring 52 is smaller than the inside diameter of aperture 80 in hanger 50. Just prior to the brazing operation, flux is applied to the capacitor wall 17 where the connection will be made and to each side of hanger 50. In the preferred embodiment, the ring of brazing alloy 52 is formed of wire stock having a diameter of 0.060" and is made of almost equal amounts of silver, zinc, copper and cadmium. However, those skilled in art will appreciate that the brazing material could be of a variety of materials including nickel and tin and is not limited to a certain proportion of any material.

In the preferred embodiment the hanger 50, capacitor wall 17 and brazing alloy ring 52 are heated through an induction process which heats the ring 52 with an inducted electric current until the brazing alloy becomes molten. FIG. 4B depicts the induction arm 53 over the ring 52, hanger 50 and wall 17. A brazing alloy ring 52 having a content of 30% silver, 27% zinc, 23% copper and 20% cadmium melts 1125° and flows at about 1310° F.

Figure 6:
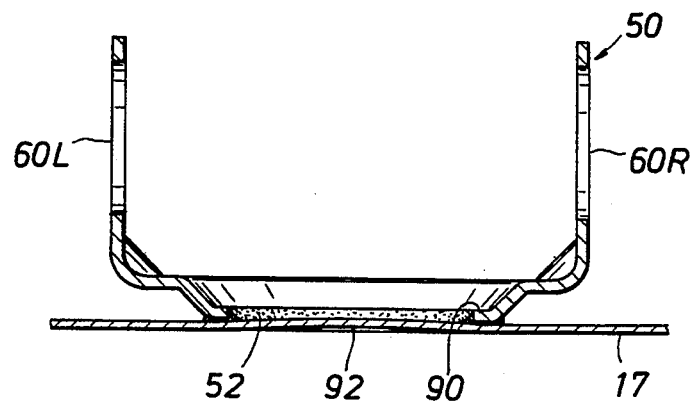
FIG. 6 is a sectional view of the completed braze.
Figure 7:
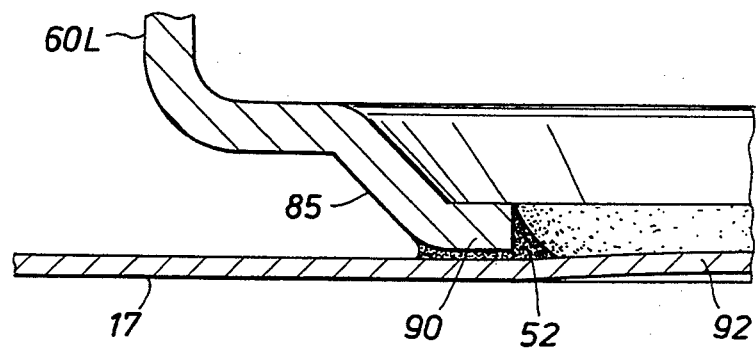
FIG. 7 is a detail view of the completed braze.

Once it is heated to a liquid state, the brazing material of ring 52 flows from inside aperture 80, under flat surface 90 to raised shoulder 85. After cooling, the brazing material extends from inside aperture 80 to outside aperture 80. FIG. 6 depicts the completed and cooled braze. FIG. 7 is a detailed view of the completed braze illustrating the flow of the ring of brazing material 52.

At approximately the same time the brazing alloy material melts and begins to flow, the tank wall 17 expands slightly causing a slight bubble 92 which can be appreciated in FIGS. 6 and 7. Bubble 92 is the result of thermal expansion of the tank wall 17. The geometry of aperture 82 causes expansion of tank wall 17 to be limited to bubble 92, thus eliminating the expansion of wall 17 in other areas around the braze. In the preferred embodiment, bubble 92 extends outward from wall 17 into aperture 82. However, bubble 92 could form downward towards the inside of tank 10 and still be within the scope of the invention.

As described herein, the present invention provides a capacitor hanger 50 and a method of attaching the hanger to a capacitor tank in a way that will not substantially change the metallurgical structure of the tank wall and cause cracking. While the device and method of the present invention has been described by reference to its preferred embodiment, it will be understood that other various embodiments of the device and method of the present invention may be possible by reference to the specification and the appended claims. For example, the ring of brazing alloy 52 could be larger than aperture 82 instead of smaller than aperture 82. Additionally, brazing alloy ring 52 could be the same diameter as flat surface 90 whereby the ring 52 is held between wall 17 and flat surface 90. Such additional embodiments shall be included within the scope of the appended claims.

We claim:

1. A capacitor and hanger assembly, comprising:
   a tank having a top, bottom and four walls, said tank constructed and arranged to hold dielectric fluid;
   a hanger having a base plate for connection to a wall of said tank, said hanger having an opening in said base plate, said opening having a raised shoulder around its perimeter, said shoulder terminating in a flat surface, whereby when said hanger is placed upon said tank wall, said flat surface provides a single ring of contact between said hanger and said tank;
   a ring of brazing alloy having an outside diameter smaller than the inside diameter of said opening said brazing ring constructed and arranged to set upon said wall of said tank within said opening of said hanger;
   whereby when said ring of brazing alloy, tank wall and hanger are heated, said ring of brazing alloy melts and flows from inside said opening to outside said opening for attaching said hanger to said tank wall.

2. The capacitor and hanger assembly in claim 1, whereby as said ring of brazing alloy melts and flows, said tank wall expands into said opening thereby forming a raised bubble within said opening.

3. The capacitor and hanger assembly in claim 2, whereby said raised shoulder extends from the surface of said base plate at an angle of substantially 45° and said flat surface is substantially parallel to said base plate.

4. The capacitor and hanger assembly in claim 3, wherein said hanger includes first and second legs extending from opposing side edges of said base plate, opposite said raised shoulder.

5. The capacitor and hanger assembly in claim 4 wherein at least one of said legs extends from said base plate at an angle of substantially 45°.

6. The capacitor and hanger assembly in claim 4, wherein at least one of said legs includes at least one mounting eye.

7. The capacitor and hanger assembly in claim 6, wherein at least one of said legs includes a substantially circular lifting eye.

8. The capacitor and hanger assembly in claim 1, whereby said ring of brazing alloy is composed of substantially equal amounts of silver, zinc, copper and cadmium.

9. The capacitor and hanger assembly in claim 8, whereby said ring of brazing alloy is made up of 30% silver, 27% zinc, 23% copper and 20% cadmium.

10. The capacitor and hanger assembly in claim 1, whereby said ring of brazing alloy is composed of silver, copper, zinc and nickel.

11. The capacitor and hanger assembly in claim 9, whereby said ring of brazing alloy melts at approximately 1125° F.

12. The capacitor and hanger assembly in claim 1, whereby said ring of brazing alloy is formed from wire having a diameter of 0.060 inches.

13. The capacitor and hanger assembly in claim 1, whereby said hanger, ring of brazing alloy and tank wall are heated through the induction of electric current.

14. The capacitor and hanger assembly in claim 1, whereby said ring of brazing alloy has a diameter substantially equal to the diameter of said flat surface, whereby said ring of brazing alloy sits on said wall of said tank directly under said flat surface of said hanger.

15. A method of brazing a hanger to a capacitor tank wall, said method comprising the steps of:
placing a ring of brazing alloy upon said tank wall;
placing said hanger upon said tank wall whereby an opening in said hanger surrounds said ring of brazing alloy;
heating said tank wall, ring of brazing alloy and hanger until said ring of brazing alloy melts and flows outwardly and said tank wall expands into said opening forming a bubble shape.

16. The method in claim 15, wherein heating said tank wall, ring of brazing alloy and hanger is performed through the induction of electric current.

17. The capacitor and hanger assembly of claim 1, wherein said ring of brazing alloy is disposed in a circular shape.

18. A hanger for attachment to a thin walled suspended member, the hanger configured to support the suspended member on a suspending member, said hanger comprising:
a base plate having an aperture therethrough;
a shoulder extending from said base plate about the perimeter of said aperture and terminating in an extending surface;
said extending surface interdisposed between the suspended member and said base plate; and
a layer of brazing material disposed between and interconnecting said extending surface and the suspended member.

19. The hanger of claim 18, wherein said aperture is circular.

20. The hanger of claim 19, wherein said suspended member is a capacitor tank.

21. The hanger of claim 20, wherein said capacitor tank has a wall thickness of less than 0.050 inches.

22. The hanger of claim 21, wherein said tank wall is 0.030 to 0.050 inches thick.

23. The hanger of claim 22, wherein said tank wall extends inward said aperture.

24. A method of connecting a suspended member to a suspending member, comprising:
forming an aperture through the suspending member, said aperture including a projecting wall extending from the perimeter thereof and terminating in a perimeter surface;
placing the suspending member on the suspended member, with said perimeter surface in contact with the suspended member;
placing brazing material adjacent said contact of said perimeter surface and said suspended member; and
heating said brazing material to permit said brazing material to flow between said perimeter surface and said suspended member.

25. The method of claim 24, wherein the suspended member is an electrical apparatus.

26. The method of claim 25, wherein said electrical apparatus includes a tank.

27. The method of claim 26, wherein said tank has a tank wall having a thickness of between 0.03 and 0.05 inches.

28. The method of claim 27, wherein the step of heating the brazing material causes expansion of said wall, and said wall projects inward said perimeter surface after interconnection of said suspended member and said suspending member.

29. The method of claim 28, wherein said suspended member is a high energy capacitor.

30. The method of claim 29, wherein said aperture is circular.

31. The method of claim 30, wherein said brazing material is disposed adjacent said perimeter surface within said aperture.

32. The method of claim 31, wherein said brazing material is disposed adjacent said perimeter surface outside said aperture.

* * * * *